(12) United States Patent
Maruyama et al.

(10) Patent No.: US 11,008,999 B2
(45) Date of Patent: May 18, 2021

(54) WAVE POWER GENERATION SYSTEM

(71) Applicants: THE UNIVERSITY OF TOKYO, Tokyo (JP); KAWASAKI JUKOGYO KABUSHIKI KAISHA, Kobe (JP)

(72) Inventors: Koki Maruyama, Tokyo (JP); Chang-Kyu Rheem, Tokyo (JP); Hidetaka Kobayashi, Tokyo (JP); Naoki Kuribayashi, Kobe (JP); Hideki Tanaka, Nishinomiya (JP); Masahide Tsuji, Kobe (JP)

(73) Assignees: THE UNIVERSITY OF TOKYO, Tokyo (JP); KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/968,523

(22) PCT Filed: Feb. 6, 2019

(86) PCT No.: PCT/JP2019/004195
§ 371 (c)(1),
(2) Date: Aug. 7, 2020

(87) PCT Pub. No.: WO2019/156110
PCT Pub. Date: Aug. 15, 2019

(65) Prior Publication Data
US 2021/0040931 A1    Feb. 11, 2021

(30) Foreign Application Priority Data
Feb. 7, 2018   (JP) .............................. JP2018-020014

(51) Int. Cl.
*F03B 13/00*   (2006.01)
*F03B 13/18*   (2006.01)
*F03B 15/00*   (2006.01)

(52) U.S. Cl.
CPC ............ *F03B 13/182* (2013.01); *F03B 15/00* (2013.01)

(58) Field of Classification Search
CPC ........ F03B 13/182; F03B 15/00; F03B 13/22; F03B 13/18; F03B 13/1805; F05B 2270/335; Y02E 10/30
See application file for complete search history.

(56) References Cited

U.S. PATENT DOCUMENTS 8,890,344 B2 * 11/2014 Hoffmann ............ G01C 13/002
290/42
2013/0147193 A1   6/2013 Hoffmann et al.
(Continued)

FOREIGN PATENT DOCUMENTS

JP       2015-108344 A     6/2015

*Primary Examiner* — Julio C. Gonzalez
(74) *Attorney, Agent, or Firm* — Oliff PLC

(57) ABSTRACT

A wave power generation system includes a wave receiving member, ram cylinder hydraulic pump device, change value sensor, accumulator device, hydraulic motor, power generator, and controller. The member is arranged near a virtual reflection surface that reflects a coming incident wave. The controller sets a torque command used when the generator generates electric power. Based on a differential value of a change value detected by the sensor and changes in accordance with a swing amount of the member, the controller determines whether the member is swinging toward a first or second side in a swing direction. When the controller determines the member is swinging toward the second side by receiving force of a reflected wave reflected by the virtual reflection surface, the controller changes the torque command from the command set when the controller determines the member is swinging toward the first side by receiving force of the incident wave.

9 Claims, 4 Drawing Sheets

(56) References Cited

U.S. PATENT DOCUMENTS

2020/0400115 A1\* 12/2020 Maruyama ............ F03B 13/182
2021/0040931 A1\* 2/2021 Maruyama ............ F03B 13/182

\* cited by examiner

WAVE POWER GENERATION SYSTEM

TECHNICAL FIELD

The present invention relates to a wave power generation system configured to generate electric power by utilizing the force of waves.

BACKGROUND ART

Natural energy power generation systems which utilize various natural energies, such as wind energy and solar energy, are being put into practical use, and a wave power generation system is known as one of the natural energy power generation systems. The wave power generation system converts wave energy into mechanical energy and further converts the mechanical energy into electric energy. One example of the wave power generation system is a wave power generation system disclosed in PTL 1, for example.

In the wave power generation system of PTL 1, a wave receiving member swings by receiving wave energy, and a ram cylinder pump operates in conjunction with this swinging. At this time, the pump discharges an operating liquid having pressure corresponding to the wave energy received by the wave receiving member at a flow rate corresponding to the wave energy received by the wave receiving member. The discharged operating liquid is leveled by an accumulator and then supplied to a hydraulic motor. A power generator is coupled to an output shaft of the hydraulic motor. The hydraulic motor drives the power generator by an output corresponding to the flow rate and pressure of the supplied operating liquid. The power generator generates electric power corresponding to the output of the hydraulic motor. As above, the wave power generation system can convert wave energy, received by the wave receiving member, into electric energy, i.e., can generate electric power by receiving wave energy.

CITATION LIST

Patent Literature

PTL 1: Japanese Laid-Open Patent Application Publication No. 2015-108344

SUMMARY OF INVENTION

Technical Problem

In the wave power generation system of PTL 1, torque of the power generator is adjusted in accordance with the wave energy in order to make the power generator operate at a rotational frequency by which high power generation efficiency is obtained. On the other hand, the wave power generation system of PTL 1 has actual problems as below. To be specific, the wave power generation system is arranged in the vicinity of a breakwater. A front surface of the wave receiving member receives incident waves coming from the offing, and a rear surface of the wave receiving member receives reflected waves reflected in the vicinity of the breakwater. The wave receiving member alternately receives the incident waves and the reflected waves, and therefore, swings forward and rearward.

As above, the incident wave and the reflected wave make the wave receiving member swing forward and rearward, but the energy of the incident wave and the energy of the reflected wave do not necessarily coincide with each other. For example, the breakwater has a role of reducing the energy of the coming waves. Therefore, the energy received by the wave receiving member from the reflected wave may be smaller than the energy received by the wave receiving member from the incident wave. A torque command of the power generator is set in accordance with the wave energy as described above. When the torque command of the power generator is set in accordance with the wave energy of the incident wave, there may be a problem that, for example, even when the wave receiving member receives the reflected wave, the wave receiving member does not move due to excessively high resistance of the wave receiving member. In contrast, when the torque command of the power generator is set low in accordance with the wave energy of the reflected wave, the power generator cannot adequately generate electric power by the reception of the incident waves, and therefore, the power generation efficiency deteriorates.

An object of the present invention is to provide a wave power generation system capable of improving power generation efficiency.

Solution to Problem

A wave power generation system of the present invention includes: a wave receiving member provided near a virtual reflection surface configured to reflect a coming incident wave, the wave receiving member being configured to swing toward a first side in a swing direction by receiving force of the incident wave and swing toward a second side in the swing direction by receiving force of a reflected wave reflected by the virtual reflection surface; a ram cylinder hydraulic pump device configured to convert a swinging motion of the wave receiving member into a linear motion to discharge an operating liquid to a main passage; a change value sensor configured to detect a change value that changes in accordance with a swing amount of the wave receiving member; an accumulator device configured to accumulate, under pressure, the operating liquid discharged from the hydraulic pump device and discharge the accumulated operating liquid when pressure in the main passage decreases; a hydraulic motor configured to be supplied with the operating liquid flowing through the main passage and drive an output shaft of the hydraulic motor based on an output value corresponding to pressure and flow rate of the supplied operating liquid; a power generator configured to generate electric power corresponding to the output value given to the output shaft of the hydraulic motor and change a torque command used during power generation; and a controller configured to set the torque command. Based on a differential value of the value detected by the change value sensor, the controller determines whether the wave receiving member is swinging toward the first side or second side in the swing direction. When the controller determines that the wave receiving member is swinging toward the second side in the swing direction, the controller changes the torque command from the torque command set when the controller determines that the wave receiving member is swinging toward the first side in the swing direction.

According to the present invention, the torque command can be set in accordance with the energy of the incident wave and the energy of the reflected wave. With this, for example, even when the wave receiving member receives any of the energy of the incident wave and the energy of the reflected wave, the power generator can efficiently generate electric power. Therefore, the power generation efficiency of the wave power generation system can be improved.

In the above invention, the hydraulic pump device may include a rod coupled to the wave receiving member, the rod being configured to linearly reciprocate in association with the swinging of the wave receiving member. The change value sensor may be a stroke sensor configured to detect a stroke amount of the rod as the change value. The controller may determine the swing direction of the wave receiving member based on a speed of the rod, the speed being a differential value of the stroke amount detected by the stroke sensor.

According to the above configuration, the swing direction of the wave receiving member can be easily determined, and the improvement of the power generation efficiency of the wave power generation system can be easily realized.

In the above invention, the hydraulic pump device may include: a rod coupled to the wave receiving member, the rod being configured to linearly reciprocate in association with the swinging of the wave receiving member; and a pair of cylinders into which both end portions of the rod are inserted such that the rod is able to reciprocate. When the rod moves in a first direction that is a direction toward one of the pair of cylinders, the hydraulic pump device may discharge the operating liquid from the one cylinder and suck the operating liquid into the other cylinder. When the rod moves in a second direction that is a direction toward the other cylinder, the hydraulic pump device may discharge the operating liquid from the other cylinder and suck the operating liquid into the one cylinder. The wave receiving member may be coupled to the rod such that when the rod is located at a neutral position, the wave receiving member is offset from a position at which the wave receiving member hangs down, the neutral position being such a position that a maximum stroke amount of the rod in the first direction and a maximum stroke amount of the rod in the second direction are the same as each other.

When the energy of the incident wave and the energy of the reflected wave are different from each other, the wave receiving member swings about a position that is different from a position at which the wave receiving member hangs down. According to the above configuration, the wave receiving member is offset in advance. With this, even when the energy of the incident wave and the energy of the reflected wave are different from each other, the rod can be located near the neutral position when the wave receiving member is located at a swing center. Therefore, the stroke amount of the rod from the neutral position in the first direction and the stroke amount of the rod from the neutral position in the second direction can be made to become substantially the same as each other, i.e., a stroke range of the rod in the first direction and a stroke range of the rod in the second direction can be made to be equal to each other. On this account, the stroke of the rod can be effectively used.

In the above invention, when the controller determines that the wave receiving member is swinging toward the second side in the swing direction, the controller may make the torque command smaller than the torque command set when the controller determines that the wave receiving member is swinging toward the first side in the swing direction.

According to the above configuration, when the reflected wave is smaller than the incident wave, the power generator can be made to efficiently generate electric power. Therefore, the power generation efficiency of the wave power generation system can be improved.

In the above invention, the wave power generation system may further include a wave height sensor configured to detect a wave height of the incident wave. The controller may estimate the output value based on a detection result of the wave height sensor. Based on the estimated output value, the controller may set the torque command such that a rotational frequency of the power generator becomes a predetermined rotational frequency.

According to the above configuration, the output value of the hydraulic pump is estimated in advance, and the torque command is set based on the estimated output value. With this, the torque command can be set to the torque corresponding to the energy of the incident wave received by the wave receiving member at that time. On this account, the power generator can be made to further highly efficiently generate electric power.

In the above invention, the wave power generation system may further include a relief valve configured to open the main passage and a tank in accordance with a command from the controller. The controller may estimate energy of the wave based on the detection result of the wave height sensor. When the estimated energy exceeds predetermined allowable energy, the controller may make the relief valve open the main passage and the tank.

According to the above configuration, it is possible to prevent a case where when the waves are high at the time of a typhoon or the like, and therefore, the energy of the waves is large, the output input to the power generator exceeds a maximum output of the power generator, and this damages the wave power generation system.

In the above invention, the wave height sensor may be arranged away from the wave receiving member by a predetermined distance X or more so as to be located at an opposite side of the virtual reflection surface across the wave receiving member. The predetermined distance X may be a wavelength of the incident wave having a cycle that appears frequently among various cycles of the incident waves incident on the wave receiving member.

According to the above configuration, the energy of the input wave having a cycle that appears frequently can be accurately estimated, and the wave power generation system can be operated with a higher power generation efficiency.

In the above invention, the wave power generation system may further include: a rotational frequency detector configured to detect a rotational frequency of the power generator; a liquid pressure detector configured to detect the pressure of the operating liquid supplied to the hydraulic motor; a flow detector configured to detect the flow rate of the operating liquid supplied to the hydraulic motor; and a torque detector configured to detect output torque given to the output shaft of the hydraulic motor. The controller may compare a power generation amount, a first output value, and a second output value with each other, the power generation amount being calculated based on the set torque command and a rotational frequency detected value detected by the rotational frequency detector, the first output value being calculated based on a liquid pressure detected value detected by the liquid pressure detector and a flow rate detected value detected by the flow detector, the second output value being calculated based on the output torque detected by the torque detector and the rotational frequency detected value detected by the rotational frequency detector. When the power generation amount, the first output value, and the second output value are inconsistent with each other, the controller may determine that there is a failure.

According to the above configuration, since the failure is determined based on the consistency, the occurrence of incorrect determination of the failure can be suppressed.

In the above invention, the wave power generation system may further include a liquid pressure detector configured to detect pressure of the operating liquid flowing through the main passage. The accumulator device may include a plurality of accumulators and a plurality of switching valves. Accumulable pressure of the operating liquid may be different among the plurality of accumulators. The plurality of switching valves may be provided so as to correspond to the plurality of accumulators, and each of the switching valves may switch a connection status between the corresponding accumulator and the main passage. The controller may control operations of the plurality of switching valves in accordance with a liquid pressure detected value detected by the liquid pressure detector to switch a connection status between each of the plurality of accumulators and the main passage.

According to the above configuration, in accordance with the pressure of the operating liquid, the controller switches the accumulator to be connected to the main passage. Therefore, the pressure of the operating liquid flowing through the main passage can be accurately leveled.

Advantageous Effects of Invention

According to the present invention, the power generation efficiency can be improved.

DESCRIPTION OF EMBODIMENTS

Hereinafter, a wave power generation system 1 according to an embodiment of the present invention will be described with reference to the drawings. It should be noted that directions stated in the following description are used for convenience sake, and directions and the like of components of the present invention are not limited. Moreover, the wave power generation system 1 described below is just one embodiment of the present invention. Therefore, the present invention is not limited to the embodiment. Additions, deletions, and modifications may be made within the scope of the present invention.

Wave Power Generation System

Figure 1:
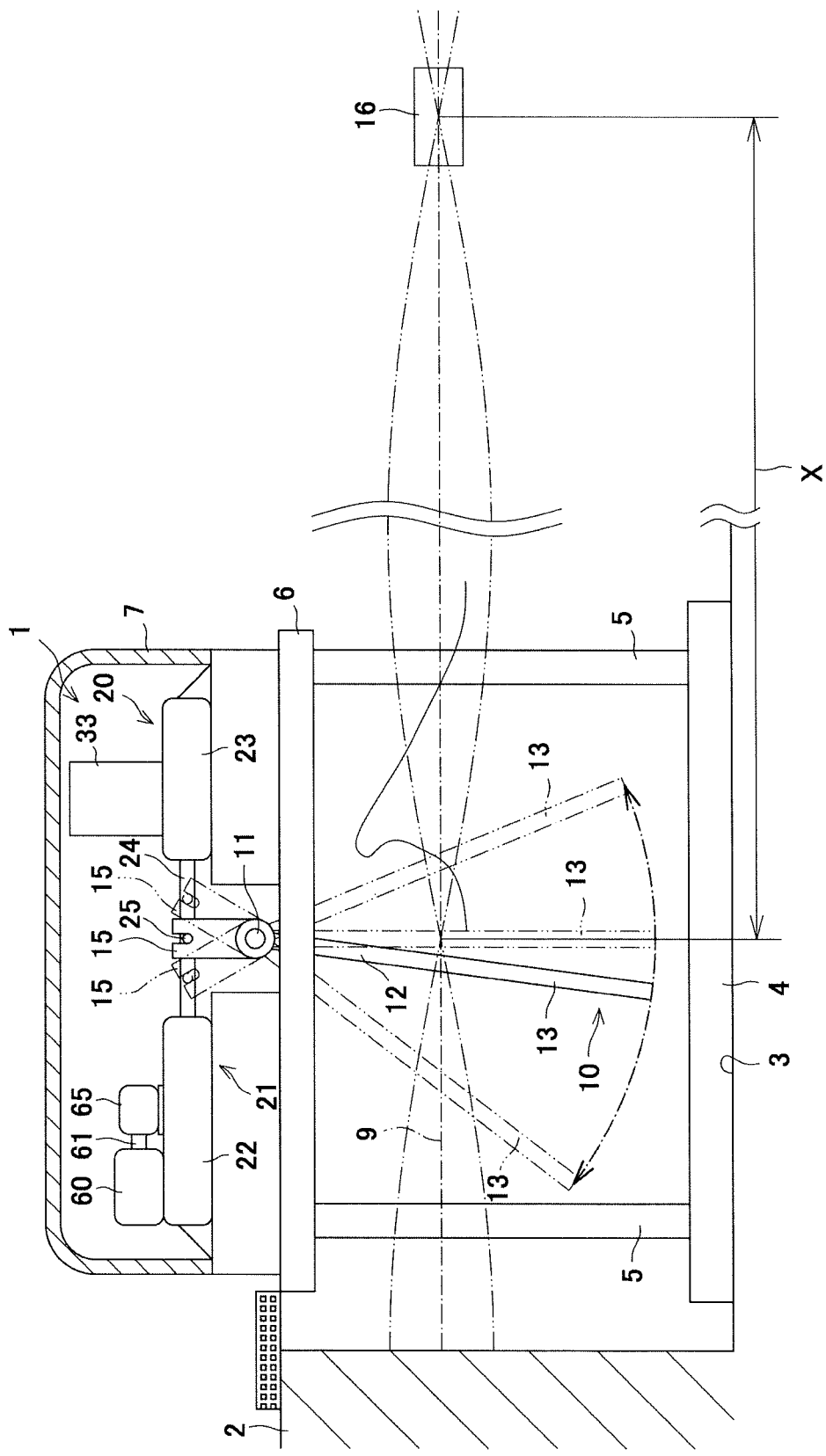
FIG. 1 is a schematic side view of a wave power generation system when viewed from a lateral side.
Figure 2:
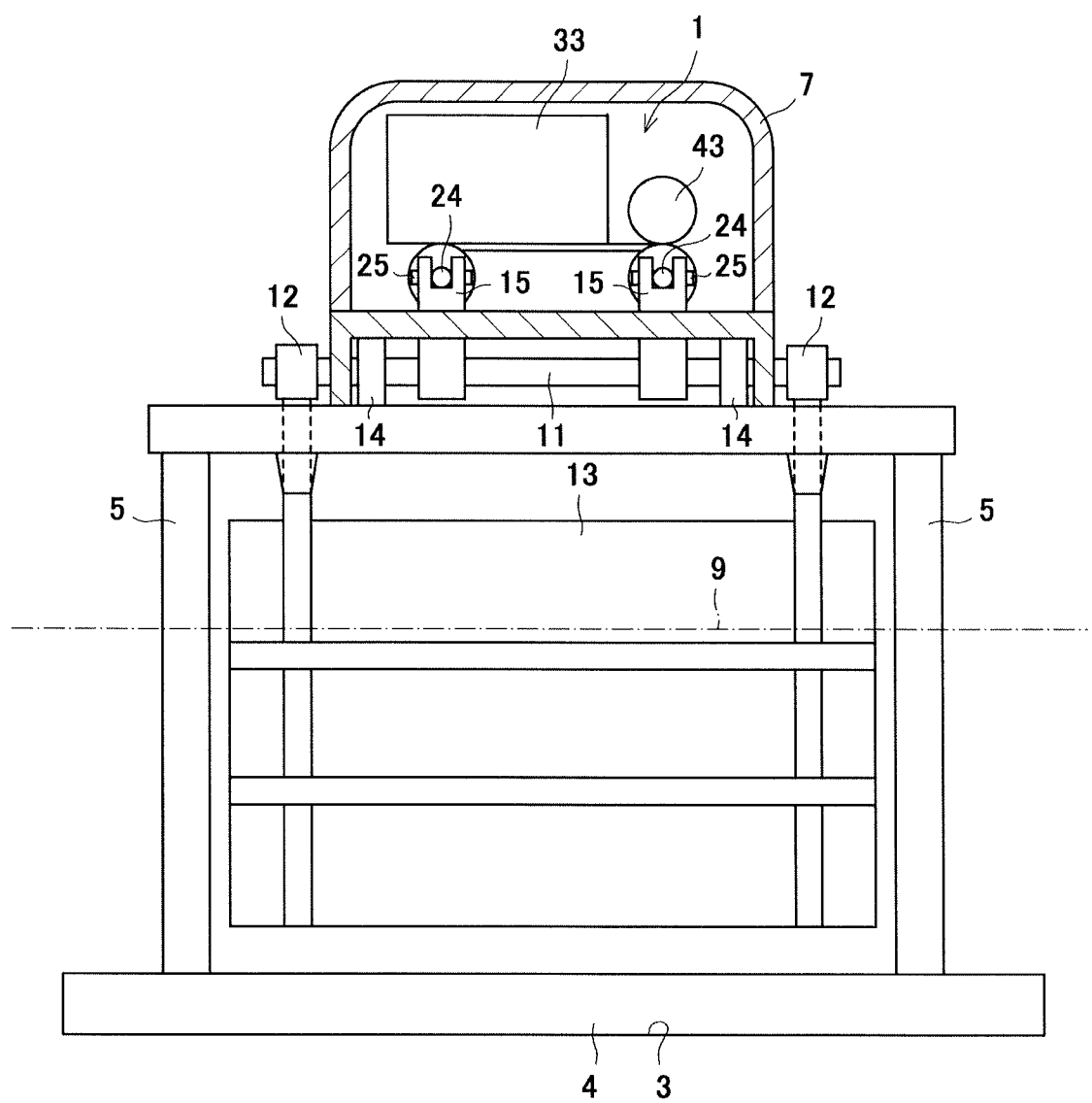
FIG. 2 is a schematic front view of the wave power generation system of FIG. 1 when viewed from front.

The wave power generation system 1 shown in FIG. 1 is a power generation system configured to generate electric power by converting force of waves breaking on a shore, i.e., wave energy into electric energy. The wave power generation system 1 is provided in front of a breakwater 2 provided on a shore. Specifically, a concrete sinker 4 is provided on a seabed 3 in the vicinity of the breakwater 2, and a plurality of (four, for example) posts 5 stand on the concrete sinker 4. A floor panel 6 having a substantially rectangular shape in a plan view is mounted on and fixed to the plurality of posts 5, and the floor panel 6 is covered with a waterproof cover 7. Part of the wave power generation system 1 is accommodated in the waterproof cover 7. As shown in FIGS. 1 and 2, the wave power generation system 1 is configured as a steel marine jacket structure including a pendulum wave receiving mechanism 10.

Wave Receiving Mechanism

The wave receiving mechanism 10 included in the wave power generation system 1 includes a shaft 11, a pair of attaching portions 12, and a wave receiving member 13. The shaft 11 is a shaft extending in a left-right direction in the waterproof cover 7. An intermediate portion of the shaft 11 is supported by a pair of bearing members 14 so as to be turnable. The pair of attaching portions 12 are fixed to both axial end portions of the shaft 11. The attaching portions 12 extend downward from both axial end portions of the shaft 11. The attaching portions 12 pass through grooves (not shown) formed on the floor panel 6 and extend downward beyond the floor panel 6. Lower end portions of the attaching portions 12 are located above a sea surface 9. The wave receiving member 13 is integrally provided at the lower end portions of the attaching portions 12.

The wave receiving member 13 is a plate having a substantially rectangular shape when viewed from front (i.e., from the offing side). Most of the wave receiving member 13 other than its upper portion is located under the sea surface 9. A front surface of the wave receiving member 13 arranged as above receives waves (incident waves) coming from the offing. Moreover, the wave receiving member 13 receives the force of waves (reflected waves) reflected by the breakwater 2 and the vicinity of the breakwater 2. The wave receiving member 13 which has received the force of the waves swings forward and rearward (i.e., toward the offing and the breakwater 2) about an axis of the shaft 11. The shaft 11 also turns about the axis together with the wave receiving member 13. As described above, the pair of bearing members 14 are arranged at the shaft 11 so as to be located away from each other in the left-right direction. A pair of tillers 15 are provided between the pair of bearing members 14 so as to be located away from each other in the left-right direction. The pair of tillers 15 are fixed to the shaft 11 so as not to be turnable relative to the shaft 11 and extend upward from the shaft 11. Moreover, upper end portions of the tillers 15 are coupled to a hydraulic pump device 20 of the wave power generation system 1.

Pump Device

The hydraulic pump device 20 includes a pair of pumps 21. Each of the pumps 21 is a ram cylinder pump and includes a pair of cylinders 22 and 23 and a rod 24. Each of the pair of cylinders 22 and 23 is formed in a substantially bottomed tubular shape. Openings of the pair of cylinders 22 and 23 are opposed to each other. The pair of cylinders 22 and 23 are arranged so as to be spaced apart from each other in a direction along axes of the cylinders 22 and 23 (in the present embodiment, the front-rear direction). One end portion and the other end portion of the rod 24 are inserted into the cylinders 22 and 23. The one end portion and the other end portion of the rod 24 can reciprocate in the cylinders 22 and 23 along the axes of the cylinders 22 and 23.

A pin 25 extending in a direction perpendicular to the axis of the rod 24 (i.e., the left-right direction in the present embodiment) is integrally provided at an axial middle portion of the rod 24. An upper end portion of the tiller 15 is coupled to the pin 25. With this, when the tillers 15 swing (see one-dot chain lines and two-dot chain lines in FIG. 1), the rods 24 reciprocate, i.e., the tillers 15 convert a swinging motion of the wave receiving member 13 into reciprocating motions (linear motions) of the rods 24.

Figure 3:
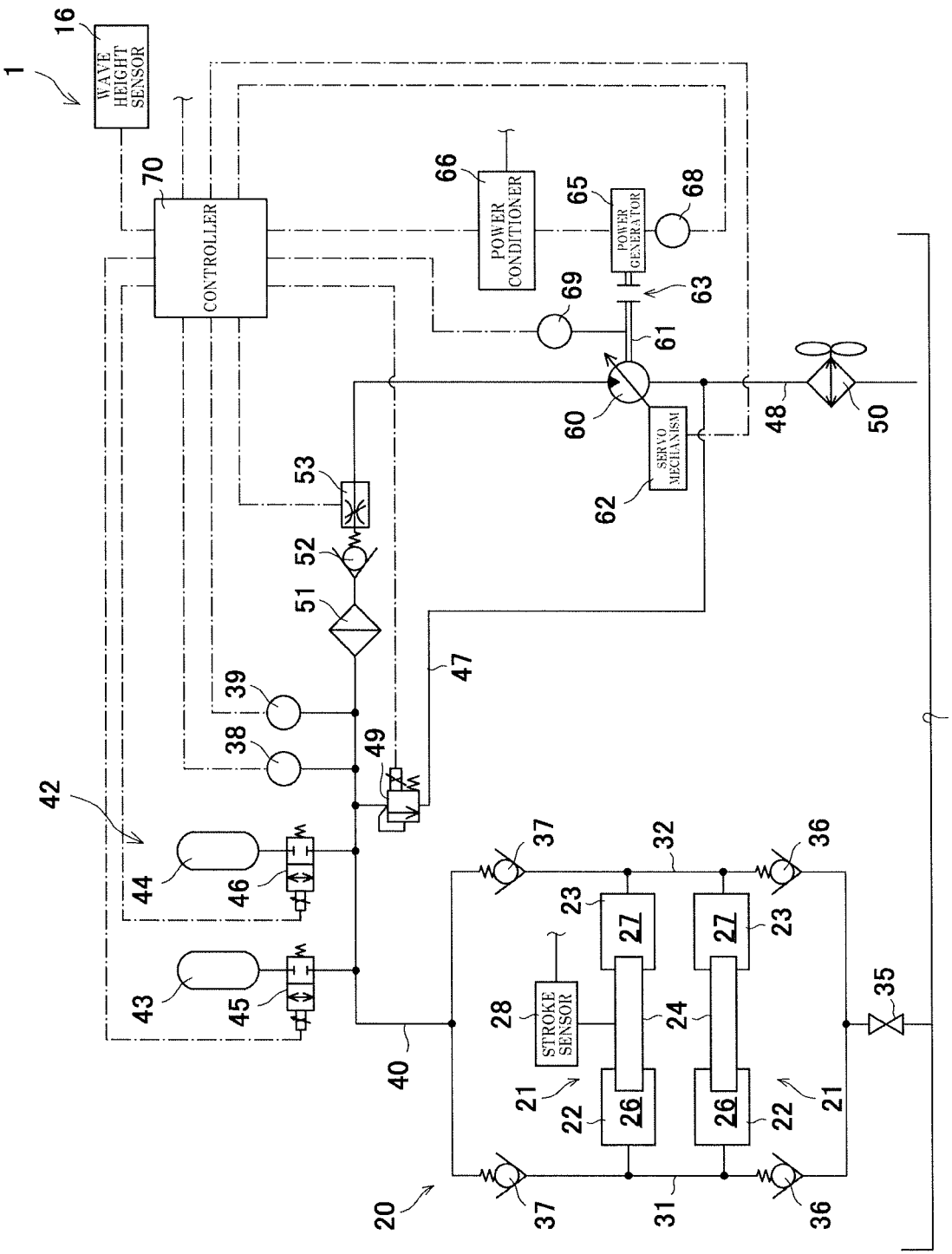
FIG. 3 is a hydraulic circuit diagram showing the configuration of the wave power generation system of FIG. 1.

In the hydraulic pump device 20 configured as above, as shown in FIG. 3, liquid chambers 26 and 27 are formed in the cylinders 22 and 23, respectively. The liquid chambers 26 and 27 are respectively connected to two pump passages 31 and 32 of the hydraulic pump device 20 through ports. To be specific, the first liquid chambers 26 of the pair of pumps 21 are connected to a first pump passage 31, and the second liquid chambers 27 of the pair of pumps 21a are connected to a second pump passage 32. Downstream sides of the two pump passages 31 and 32 are joined to each other, and upstream sides of the two pump passages 31 and 32 are joined to each other. After the upstream sides of the two pump passages 31 and 32 are joined to each other, they are connected to a tank 33 through a main stop valve 35. Moreover, after the downstream sides of the two pump passages 31 and 32 are joined to each other, they are connected to a main passage 41 of a below-described hydraulic drive circuit 40. Furthermore, two check valves 36 and 37 are provided on each of the two pump passages 31 and 32.

In the hydraulic pump device 20 configured as above, when the rod 24 moves toward one side in an axial direction, the operating liquid in the first liquid chamber 26 is discharged to the first pump passage 31, and the discharged operating liquid is introduced through the second check valve 37 to the main passage 41. On the second pump passage 32, the first check valve 36 opens, and the operating liquid is sucked from the tank 33 into the second liquid chamber 27. In contrast, when the rod 24 moves toward the other side in the axial direction, the operating liquid in the second liquid chamber 27 is discharged to the second pump passage 32, and the discharged operating liquid is introduced through the second check valve 37 to the main passage 41. On the first pump passage 31, the first check valve 36 opens, and the operating liquid is sucked from the tank 33 into the first liquid chamber 26. As above, in the hydraulic pump device 20, when the rod 24 reciprocates, the operating liquid is discharged to the main passage 41 of the hydraulic drive circuit 40.

Hydraulic Drive Circuit

The hydraulic drive circuit 40 includes the above-described main passage 41. An accumulator device 42 is connected to the main passage 41. The accumulator device 42 includes a plurality of (two in the present embodiment) accumulators 43 and 44 and a plurality of (two in the present embodiment) switching valves 45 and 46. The accumulators 43 and 44 are configured to be able to accumulate the operating liquid under pressure. Accumulable pressure of the operating liquid accumulated by the accumulator 43 and accumulable pressure of the operating liquid accumulated by the accumulator 44 are different from each other. The switching valves 45 and 46 are provided so as to correspond to the accumulators 43 and 44, respectively. The accumulators 43 and 44 are connected to the main passage 41 through the corresponding switching valves 45 and 46. Each of the switching valves 45 and 46 can switch, based on a switching command input thereto, a connection status between the corresponding accumulator 43 or 44 and the main passage 41. A flow sensor 38 and a liquid pressure sensor 39 are attached to the main passage 41 so as to be located downstream of the accumulator device 42. The flow sensor 38 detects the flow rate of the operating liquid flowing through the main passage 41. The liquid pressure sensor 39 detects the pressure of the operating liquid flowing through the main passage 41.

A relief passage 47 is connected to a portion of the main passage 41 which portion is located upstream of the flow sensor 38. The relief passage 47 is connected to the tank 33 through a tank passage 48. A relief valve 49 is interposed on the relief passage 47. When the pressure of the operating liquid flowing through the main passage 41 becomes set relief pressure or more, the relief valve 49 can release the operating liquid to the tank 33 by opening the relief passage 47. With this, the pressure of the operating liquid flowing through the main passage 41 can be limited to the relief pressure or less. Moreover, an oil cooler 50 is interposed on the tank passage 48 and cools the operating liquid flowing through the tank passage 48.

Furthermore, a filter 51, a check valve 52, and a flow regulating valve 53 are interposed on the main passage 41. The filter 51, the check valve 52, and the flow regulating valve 53 are arranged downstream of the two sensors 38 and 39 and are lined up in this order from an upstream side (i.e., from the hydraulic pump device 20 side). The check valve 52 allows the flow of the operating liquid from an upstream side to a downstream side and blocks the flow of the operating liquid in the opposite direction. The flow regulating valve 53 is a so-called variable flow restrictor. The flow regulating valve 53 limits the flow rate of the operating liquid in accordance with a flow rate command input to the flow regulating valve 53. A hydraulic motor 60 is further provided downstream of the flow regulating valve 53 having the above function.

Hydraulic Motor

The hydraulic motor 60 is, for example, a swash plate motor. The hydraulic motor 60 is driven by the operating liquid, supplied through the main passage 41, to rotate an output shaft 61 of the hydraulic motor 60. More specifically, the hydraulic motor 60 rotates the output shaft 61 at a rotational speed corresponding to the flow rate of the supplied operating liquid and a suction volume of the hydraulic motor 60. The hydraulic motor 60 is a so-called variable displacement swash plate motor. By changing a tilting angle of a swash plate 60a of the hydraulic motor 60, the hydraulic motor 60 can change the suction volume, i.e., can adjust the rotational speed of the output shaft 61. The hydraulic motor 60 configured as above is provided with a servo mechanism 62 in order to change the tilting angle of the swash plate 60a.

The servo mechanism 62 adjusts the tilting angle of the swash plate 61a by moving a linear motion mechanism (for example, a piston or a ball screw) in accordance with a servo command input to the servo mechanism 62. To be specific, the servo mechanism 62 can adjust the rotational speed of the output shaft 61 by changing the suction volume of the hydraulic motor 60 in accordance with the servo command input to the servo mechanism 62. A power generator 65 is attached to the output shaft 61 through a clutch 63.

Power Generator

The power generator 65 is a so-called synchronous generator and is constituted by, for example, a permanent magnet generator. The power generator 65 generates AC power (hereinafter may be simply referred to as "electric power") having a frequency corresponding to the rotational speed of the output shaft 61. Therefore, even when the output shaft 61 rotates at a rated rotational frequency (for example, 1,500 rpm or 1,800 rpm) or less, or even when the rotational speed of the output shaft 61 is unstable, the power generator 65 can generate electric power. In the present embodiment, the synchronous generator is adopted as the power generator 65. However, an induction generator may be used as the power generator 65. The power generator 65 configured as above is connected to a power conditioner 66. The electric power generated at the power generator 65 is transmitted to the power conditioner 66.

Power Conditioner

The power conditioner 66 that is a frequency changer is connected to an electric power system (not shown). The power conditioner 66 adjusts the voltage and frequency of the electric power such that the voltage and frequency of the electric power become substantially the same as the voltage and frequency of the electric power supplied from a commercial power supply. The power conditioner 66 further adjusts the phase of the electric power and then transmits the electric power to the electric power system. A rotational frequency sensor 68 is provided at the power generator 65. The rotational frequency sensor 68 detects the rotational speed of the output shaft 61, i.e., the rotational frequency of the output shaft 61. The rotational frequency sensor 68 is connected to a controller 70 together with the flow sensor 38 and the liquid pressure sensor 39 and outputs a detection result to the controller 70.

Controller

The controller 70 is connected to a wave height sensor 16, a stroke sensor 28, and a torque sensor 69 in addition to the three sensors 38, 39, and 68. The wave height sensor 16 is a sensor configured to measure the height of the wave, especially the height of the incident wave coming from the offing. For example, the wave height sensor 16 is arranged away from the wave receiving member 13 by a distance X or more. It should be noted that the distance X is equal to a wavelength of the wave having a frequency (in the present embodiment, a frequency that appears most frequently) that appears frequently among various frequencies of the waves flowing toward the breakwater 2. The stroke sensor 28 is provided at at least one of the rods 24 of the pair of cylinders 22 and 23 and detects a stroke amount of the rod 24 when the rod 24 reciprocates. The torque sensor 69 is provided at the output shaft 61 of the hydraulic motor 60 and detects torque output from the hydraulic motor 60. The controller 70 is electrically connected to various devices, such as the two switching valves 45 and 46, the relief valve 49, the flow regulating valve 53, the servo mechanism 62, and the power conditioner 66. To be specific, the controller 70 controls the operations of the devices based on the detection results of the sensors 16, 28, 38, 39, and 68. Hereinafter, the operations of the wave power generation system 1 including the functions and control operations of the controller 70 will be described in detail.

Operations of Wave Power Generation System

In the wave power generation system 1, when the wave receiving member 13 swings by receiving the force of the waves, the shaft 11 turns, and the operating liquid is discharged from the hydraulic pump device 20 to the main passage 41. Since the hydraulic pump device 20 is a ram cylinder pump, the flow (flow rate and pressure) of the operating liquid discharged from the hydraulic pump device 20 pulsates. In order to level the pulsating flow of the operating liquid, the accumulator device 42 accumulates the operating liquid (i.e., accumulates the operating liquid under pressure) flowing through the main passage 41 and discharges the accumulated operating liquid. The pressure of the pulsating operating liquid changes in accordance with the wave energy received by the wave receiving member 13. The range of accumulable pressure is different between the two accumulators 43 and 44 included in the accumulator device 42. In accordance with the pressure of the pulsating operating liquid, the controller 70 selects the accumulator 43 or 44 to be connected to the main passage 41.

To be specific, based on the detection result of the liquid pressure sensor 39, the controller 70 determines the pressure of the operating liquid flowing through the main passage 41. Based on the result of this determination, the controller 70 controls the switching valves 45 and 46 as below. For example, when the controller 70 determines that the pressure of the operating liquid is first switching pressure or more, the controller 70 outputs the switching command to the first switching valve 45 to connect the first accumulator 43, in which the accumulated pressure is relatively high, to the main passage 41.

On the other hand, when the controller 70 determines that the pressure of the operating liquid is less than second switching pressure (> first switching pressure), the controller 70 outputs the switching command to the second switching valve 46 to connect the second accumulator 44, in which the accumulated pressure is lower than the accumulated pressure of the first accumulator 43, to the main passage 41. When the controller 70 determines that the pressure of the operating liquid is lower than the second switching pressure (pressure higher than the first switching pressure), the controller 70 outputs the switching commands to both of the two switching valves 45 and 46 to connect both of the two accumulators 43 and 44 to the main passage 41.

As above, in accordance with the pressure of the operating liquid flowing through the main passage 41, the controller 70 can change the accumulator (43, 44) to be connected to the main passage 41. To be specific, in accordance with the wave energy received by the wave receiving member 13, the controller 70 can change the accumulator (43, 44) which is made to accumulate the operating liquid under pressure. With this, the pressure of the operating liquid flowing through the main passage can be accurately leveled. As a result, the output shaft 61 of the hydraulic motor 60 can be stably rotated. Since the output shaft 61 of the hydraulic motor 60 configured to rotate as above is shared with the power generator 65, the rotational speed of the output shaft 61 can be detected by the rotational frequency sensor 68, and the detection result is output from the rotational frequency sensor 68 to the controller 70.

The controller 70 controls the operation of the servo mechanism 62 based on the detection result of the rotational frequency sensor 68. To be specific, the controller 70 adjusts the tilting angle of the swash plate 61a based on the detection result of the rotational frequency sensor 68, and with this, maintains the rotational frequency of the output shaft 61 within a predetermined range (for example, the above-described rated rotational frequency and values therearound). Simultaneously, the controller 70 sets, through the power conditioner 66, the torque (hereinafter referred to as a "torque command") of the power generator 65 used during power generation and makes the power generator 65 perform the power generation based on the torque command. With this, the power generator 65 can be rotated at a constant speed. Since the power generator 65 is rotated at the constant speed, the power generator 65 can output electric power having a stable frequency. The electric power output as above can be transmitted from the power generator 65 to the power conditioner 66 and then transmitted from the power conditioner 66 to the electric power system. It should be noted that the voltage, phase, and frequency of the electric power generated are adjusted by the power conditioner 66.

Figure 4:
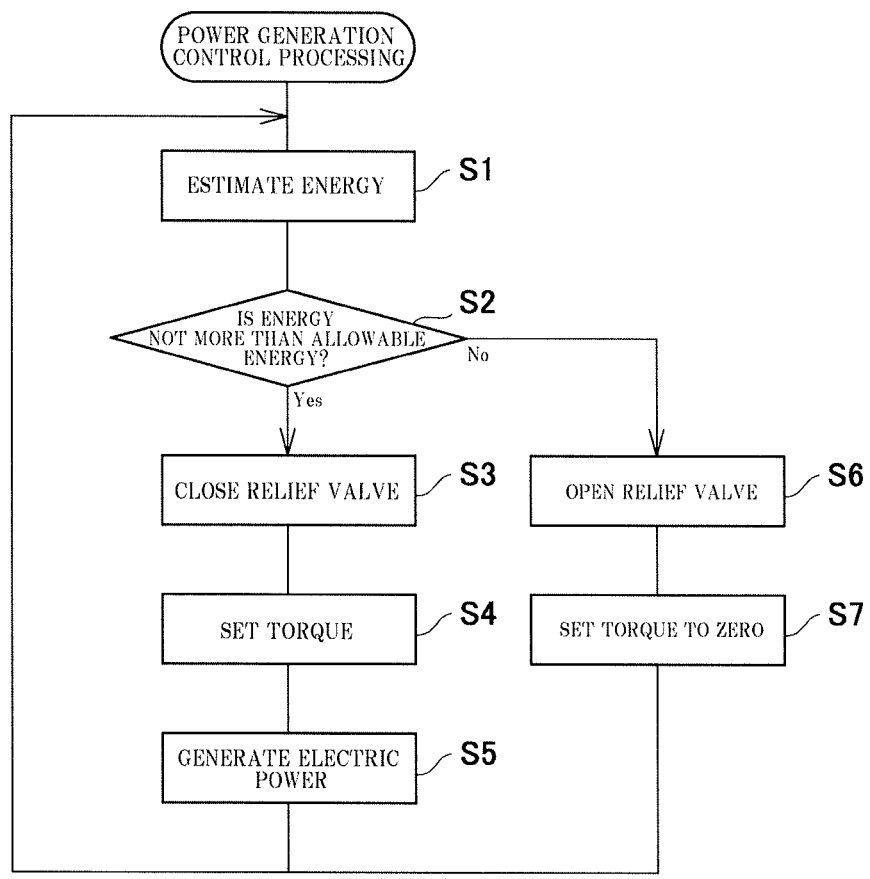
FIG. 4 is a flow chart for explaining a procedure of power generation control processing executed by a controller of the wave power generation system.

In the wave power generation system 1 configured as above, the controller 70 further performs the following power generation control processing. The power generation control processing will be described with reference to the flow chart of FIG. 4. To be specific, when electric power is supplied to the controller 70, the controller 70 executes the power generation control processing and proceeds to Step S1. In Step S1 that is an estimating step, the controller 70 estimates, based on the detection result of the wave height sensor 16, the energy of the incident waves which will be received by the wave receiving member 13 next time and thereafter. To be specific, the wave energy is proportional to the square of the amplitude of the wave, and the amplitude of the wave can be calculated by measuring the wave height of one cycle of the wave. As described above, the wave height sensor 16 is arranged away from the wave receiving member 13 by the distance X or more. Therefore, the controller 70 can recognize the details of the incident waves which will be received by the wave receiving member 13 next time and thereafter and can accurately estimate the energy of the incident waves. After the energy of the incident waves is estimated, the controller 70 proceeds to Step S2.

In Step S2 that is a power generation determining step, the controller 70 determines based on the energy of the incident wave whether or not the power generation can be performed. To be specific, the controller 70 determines whether or not the energy of the incident wave estimated in Step S1 is a predetermined allowable energy or less. It should be noted that the allowable energy is a value preset based on: conversion efficiency when the wave energy is converted into the electric energy through the mechanical energy; and an allowable maximum power generation capacity of the power generator 65. The allowable energy is set such that the power generator 65 is not damaged when the wave receiving member 13 receives the allowable energy, and the power generator 65 generates electric power. When the controller 70 determines that the energy of the incident wave is the allowable energy or less, the controller 70 proceeds to Step S3. In Step S3 that is a valve closing step, the controller 70 makes the relief valve 49 close the relief passage 47 or maintain a closed state of the relief passage 47. Then, the controller 70 proceeds to Step S4.

In Step S4 that is a setting step, the controller 70 sets the torque command of the power generator 65 based on the estimated energy of the incident wave. To be specific, the controller 70 calculates the output value (=output torque× rotational frequency) of the hydraulic motor 60 based on: the estimated energy of the incident wave; and the conversion efficiency when the wave energy is converted into the mechanical energy. Furthermore, in order to make the power generator 65 rotate at a predetermined rotational frequency (in the present embodiment, the above-described rated rotational frequency), the controller 70 calculates and sets the torque command based on the predetermined rotational frequency and the output torque.

As above, the controller 70 estimates the output value of the hydraulic motor 60 and sets the torque command based on the estimated output value of the hydraulic motor 60. The energy of the incident wave changes from moment to moment, and the responsivenesses of the hydraulic devices, such as the hydraulic pump device 20 and the hydraulic motor 60, are low. Therefore, when the next operation is controlled based on the current output value (i.e., when feedback control is performed), the control operation is performed based on old information, and therefore, the power generator 65 may not efficiently generate electric power. In consideration of this, as described above, in the wave power generation system 1, the controller 70 estimates the output value in advance and sets the torque command based on the estimated output value. With this, the controller 70 can set the torque command to the torque corresponding to the energy of the incident wave currently received by the wave receiving member 13. Therefore, the power generator 65 can be made to highly efficiently generate electric power.

When the calculated torque command exceeds a range which can be set in the power generator 65, the output of the hydraulic motor 60 is suppressed as below. To be specific, the pressure of the operating liquid flowing through the main passage 41 is limited to the relief pressure or less by the relief valve 49, and the flow rate of the operating liquid flowing through the main passage 41 is limited by the flow regulating valve 53. With this, the output of the hydraulic motor 60 is suppressed, the torque command is made to fall within the above range, and the power generator 65 rotates at the above predetermined rotational frequency. After the torque command is set as above, the controller 70 proceeds to Step S5.

In Step S5 that is a power generating step, the power generator 65 is made to generate electric power based on the torque command set in Step S4. As described above, the electric power generated by the power generator 65 is transmitted through the power conditioner 66 to the electric power system. After the power generation is performed, the controller 70 returns to Step S1 in preparation for the next incident wave.

On the other hand, when the controller 70 determines in Step S3 that the energy of the incident wave is not more than the allowable energy set as above, the controller 70 proceeds to Step S6. In Step S6 that is a valve opening step, the controller 70 makes the relief valve 49 open the relief passage 47 or maintain an open state of the relief passage 47. With this, the hydraulic pump device 20 becomes an unloaded state, and the controller 70 proceeds to Step S7. In Step S7 that is a zero torque command step, the controller 70 sets the torque command to zero. With this, the power generator 65 does not perform the power generation, and therefore, an excessive load can be prevented from being applied to the hydraulic drive circuit 40 and the power generator 65. To be specific, it is possible to prevent a case where when the waves are high at the time of a typhoon or the like, and therefore, the energy of the waves is large, the output input to the power generator 65 exceeds a maximum output of the power generator 65, and this damages the wave power generation system 1. Moreover, by making the hydraulic pump device 20 become the unloaded state, swing resistance of the wave receiving member 13 can be made small. With this, when the wave receiving member 13 receives the waves, the wave receiving member 13 can swing so as to avoid the waves, and therefore, the wave receiving member 13 can be prevented from being damaged by a high load.

In the power generation control processing described as above, the torque command is set in Step S4 (setting step) as below in order to further improve the power generation efficiency. To be specific, the controller 70 changes the torque command in accordance with a swing direction of the wave receiving member 13. Specifically, the controller 70 detects the stroke amount of the rod 24 from the stroke sensor 28. The stroke amount of the rod 24 is one example of a change value that changes in accordance with a swing amount (angular displacement amount) of the wave receiving member 13. For example, the stroke amount toward one side in the axial direction of the rod 24 (i.e., the stroke amount toward the offing) is detected as a positive value, and the stroke amount in the opposite direction (i.e., the stroke amount toward the breakwater 2 in the present embodiment) is detected as a negative value. Furthermore, the controller 70 performs time differential of the detected stroke amount, i.e., calculates the speed of the rod 24. Then, the controller 70 determines the swing direction of the wave receiving member 13 based on whether the sign of the calculated speed of the rod 24 is positive or negative. To be specific, when the sign of the speed of the rod 24 is positive, the controller 70 determines that the wave receiving member 13 is swinging toward the breakwater 2 by receiving the incident wave. When the sign of the speed of the rod 24 is negative, the controller 70 determines that the wave receiving member 13 is swinging toward the offing by receiving the reflected wave.

Furthermore, when the controller 70 determines that the wave receiving member 13 is swinging toward the breakwater 2 by receiving the incident wave, the controller 70 calculates and sets the torque command in Step S4. In contrast, when the controller 70 determines that the wave receiving member 13 is swinging toward the offing by receiving the reflected wave, a value obtained by multiplying the calculated torque command by a predetermined coefficient (i.e., a value less than one; 0.5 in the present embodiment) is set as a new torque command. It should be noted that the coefficient is a value set based on the wave energy absorbed by the breakwater 2. By making the torque command small as above, the power generator 65 can efficiently generate electric power both when the wave receiving member 13 receives the energy from the incident wave and when the wave receiving member 13 receives the energy from the reflected wave. Therefore, the power generation efficiency of the wave power generation system 1 can be improved.

According to the wave power generation system 1, when the energy of the incident wave and the energy of the reflected wave are different from each other, the wave receiving member 13 swings about a position that is different from a position at which the wave receiving member 13 hangs down. Therefore, the wave receiving member 13 is arranged so as to be angularly displaced toward the breakwater 2 from a vertical state shown by two-dot chain lines in FIG. 1, i.e., is offset toward the breakwater 2 from the vertical state shown by the two-dot chain lines in FIG. 1 (see the two-dot chain lines in FIG. 1). By such offset, each rod 24 can be made to be located in the vicinity of the neutral position when the wave receiving member 13 is located at a swing center. The neutral position is such a position that the pin 25 of each rod 24 is located at a substantially middle between the pair of cylinders 22 and 23, i.e., such a position that a maximum stroke amount when each rod 24 is moved from the neutral position toward the offing (in a first direction) and a maximum stroke amount when each rod 24 is moved from the neutral position toward the breakwater 2 (in a second direction) are the same as each other. Therefore, even when the energy of the incident wave and the energy of the reflected wave are different from each other, the stroke amount of each rod 24 from the neutral position toward the offing and the stroke amount of each rod 24 from the neutral position toward the breakwater 2 can be made to become substantially the same as each other, and a stroke range of each rod 24 in the first direction and a stroke range of each rod 24 in the second direction can be made to be equal to each other. With this, the stroke of each rod 24 can be effectively used, and the discharge amount of the hydraulic pump can be stabilized.

In order to detect failures in the wave power generation system 1, the controller 70 performs the following failure diagnosis. To be specific, the controller 70 acquires detected values of the flow sensor 38, the liquid pressure sensor 39, the rotational frequency sensor 68, and the torque sensor 69. Next, the controller 70 calculates an output value (i.e., a first output value) of the hydraulic motor 60 based on the flow rate detected by the flow sensor 38 and the pressure detected by the liquid pressure sensor 39. Moreover, the controller 70 calculates an output value (i.e., a second output value) of the hydraulic motor 60 based on the rotational frequency detected by the rotational frequency sensor 68 and the torque detected by the torque sensor 69. Then, the controller 70 compares the first output value with the second output value to determine whether or not the first output value and the second output value are consistent with each other. When the first output value and the second output value are consistent with each other, the controller 70 determines that there is no failure in the wave power generation system 1, more specifically in the hydraulic drive circuit 40. On the other hand, when the first output value and the second output value are not consistent with each other, the controller 70 determines that there is a failure in the wave power generation system 1. Then, the controller 70 informs of the failure by, for example, an alarm (not shown).

Furthermore, the controller 70 calculates a power generation amount of an electric motor based on the rotational frequency detected by the rotational frequency sensor 68 and the torque command. Then, the controller 70 compares the power generation amount with the first output value and the second output value. When the power generation amount, the first output value, and the second output value are consistent with each other, the controller 70 determines that there is no failure in the wave power generation system 1, more specifically in power transmission between the hydraulic motor 60 and the power generator 65. In contrast, when the power generation amount, the first output value, and the second output value are not consistent with each other, the controller 70 determines that there is a failure in the wave power generation system 1. Then, the controller 70 informs of the failure by, for example, an alarm (not shown). It should be noted that the consistency among the power generation amount, the first output value, and the second output value is determined in consideration of, for example, the power generation efficiency of the power generator 65 based on whether or not the power generation amount falls within a predetermined range regarding each of the first output value and the second output value (i.e., for example, a range of 75% or more and 98% or less of each output value). Furthermore, the consistency between the first output value and the second output value is not limited to a case where the first output value and the second output value are equal to each other. As long as the consistency between the first output value and the second output value falls within a predetermined range, the controller 70 may determine that the first output value and the second output value are consistent with each other.

As above, since the controller 70 determines the failure based on the detected values of the plurality of sensors 38, 39, 68, and 69, the occurrence of incorrect determination of the failure can be reduced.

Other Embodiments

In the wave power generation system 1 of the present embodiment, the pair of pumps 21 are lined up in the left-right direction in a plan view. However, the direction in which the pair of pumps 21 are lined up is not necessarily limited to the left-right direction. The pair of pumps 21 may be lined up in the upper-lower direction or may be lined up in the front-rear direction. In order to determine the swing direction of the wave receiving member 13, the wave power generation system 1 utilizes the stroke sensor 28 configured to detect the stroke amount as one example of the change value that changes in accordance with the swing amount (angular displacement amount) of the wave receiving member 13. However, such change value sensor is not necessarily limited to the stroke sensor 28. For example, an angular displacement sensor may be provided at the shaft 11, and the swing direction of the wave receiving member 13 may be determined from the angular displacement of the shaft 11. The change value is not limited to the angular displacement and may be the flow rate and pressure of the operating liquid discharged from the pump 21. In this case, the change value sensor is realized by a flow sensor and a pressure sensor provided at each of the two pump passages 31 and 32.

In the wave power generation system 1 of the present embodiment, the wave receiving member 13 is being offset when each rod 24 is located at the neutral position. However, the wave receiving member 13 does not necessarily have to be being offset. Moreover, the energy of the incident wave does not necessarily have to be estimated by detecting the wave energy corresponding to one cycle and may be estimated by a different method. To be specific, the wave height sensor 16 may detect the wave height of a part of the incident wave, and the energy of the incident wave may be estimated based on the detection result of the wave height sensor 16 and a wave trend (tendency) obtained by accumulated data.

The wave power generation system 1 of the present embodiment includes the two accumulators 43 and 44 but may include one accumulator or three or more accumulators. When the wave power generation system 1 includes three or more accumulators, switching valves are provided so as to correspond to the respective accumulators, and the accumulators are connected to the main passage 41 through the corresponding switching valves. Then, the controller 70 connects at least one of the accumulators to the main passage 41 in accordance with the pressure of the operating liquid flowing through the main passage 41.

Furthermore, in the wave power generation system 1 of the present embodiment, the torque command when receiving the reflected wave is set to be smaller than the torque command when receiving the incident wave. However, the torque command does not necessarily have to be set as above. To be specific, when the energy of the reflected wave is larger than the energy of the incident wave due to some actions, the torque command when receiving the reflected wave may be set to be larger than the torque command when receiving the incident wave. In this case, it is preferable that the wave receiving member 13 be offset toward the offing, not toward the breakwater 2.

Reference Signs List 1 wave power generation system
2 breakwater (virtual reflection surface)
13 wave receiving member
16 wave height sensor
20 hydraulic pump device
22 cylinder
23 cylinder
24 rod
28 stroke sensor
38 flow sensor (flow detector)
39 liquid pressure sensor (liquid pressure detector)
41 main passage
42 accumulator device
43 first accumulator
44 second accumulator
45 first switching valve
46 second switching valve
60 hydraulic motor
61 output shaft
65 power generator
68 rotational frequency sensor (rotational frequency detector)
69 torque sensor (torque detector)
70 controller

The invention claimed is:

1. A wave power generation system comprising:
   a wave receiving member provided near a virtual reflection surface configured to reflect a coming incident wave, the wave receiving member being configured to swing toward a first side in a swing direction by receiving force of the incident wave and swing toward a second side in the swing direction by receiving force of a reflected wave reflected by the virtual reflection surface;
   a ram cylinder hydraulic pump device configured to convert a swinging motion of the wave receiving member into a linear motion to discharge an operating liquid to a main passage;
   a change value sensor configured to detect a change value that changes in accordance with a swing amount of the wave receiving member;
   an accumulator device configured to accumulate, under pressure, the operating liquid discharged from the hydraulic pump device and discharge the accumulated operating liquid when pressure in the main passage decreases;
   a hydraulic motor configured to be supplied with the operating liquid flowing through the main passage and drive an output shaft of the hydraulic motor based on an output value corresponding to pressure and flow rate of the supplied operating liquid;
   a power generator configured to generate electric power corresponding to the output value given to the output shaft of the hydraulic motor and change a torque command used during power generation; and
   a controller configured to set the torque command, wherein:
   based on a differential value of the value detected by the change value sensor, the controller determines whether the wave receiving member is swinging toward the first side or second side in the swing direction; and
   the controller sets the torque command to a first torque command when the controller determines that the wave receiving member is swinging toward the first side in the swing direction and sets the torque command to a second, different torque command when the controller determines that the wave receiving member is swinging toward the second side in the swing direction.

2. The wave power generation system according to claim 1, wherein:
   the hydraulic pump device includes a rod coupled to the wave receiving member, the rod being configured to linearly reciprocate in association with the swinging of the wave receiving member;
the change value sensor is a stroke sensor configured to detect a stroke amount of the rod as the change value; and
the controller determines the swing direction of the wave receiving member based on a speed of the rod, the speed being a differential value of the stroke amount detected by the stroke sensor.

3. The wave power generation system according to claim 1, wherein:
the hydraulic pump device includes
a rod coupled to the wave receiving member, the rod being configured to linearly reciprocate in association with the swinging of the wave receiving member, and
a pair of cylinders into which both end portions of the rod are inserted such that the rod is able to reciprocate;
when the rod moves in a first direction that is a direction toward one of the pair of cylinders, the hydraulic pump device discharges the operating liquid from the one cylinder and sucks the operating liquid into the other cylinder;
when the rod moves in a second direction that is a direction toward the other cylinder, the hydraulic pump device discharges the operating liquid from the other cylinder and sucks the operating liquid into the one cylinder; and
the wave receiving member is coupled to the rod such that when the rod is located at a neutral position, the wave receiving member is offset from a position at which the wave receiving member hangs down, the neutral position being such a position that a maximum stroke amount of the rod in the first direction and a maximum stroke amount of the rod in the second direction are the same as each other.

4. The wave power generation system according to claim 1, wherein when the controller determines that the wave receiving member is swinging toward the second side in the swing direction, the controller makes the torque command smaller than the torque command set when the controller determines that the wave receiving member is swinging toward the first side in the swing direction.

5. The wave power generation system according to claim 1, further comprising a wave height sensor configured to detect a wave height of the incident wave, wherein:
the controller estimates the output value based on a detection result of the wave height sensor; and
based on the estimated output value, the controller sets the torque command such that a rotational frequency of the power generator becomes a predetermined rotational frequency.

6. The wave power generation system according to claim 5, further comprising a relief valve configured to open the main passage and a tank in accordance with a command from the controller, wherein:
the controller estimates energy of the wave based on the detection result of the wave height sensor; and
when the estimated energy exceeds predetermined allowable energy, the controller makes the relief valve open the main passage and the tank.

7. The wave power generation system according to claim 5, wherein:
the wave height sensor is arranged away from the wave receiving member by a predetermined distance X or more so as to be located at an opposite side of the virtual reflection surface across the wave receiving member; and
the predetermined distance X is a wavelength of the incident wave having a cycle that appears frequently among various cycles of the incident waves incident on the wave receiving member.

8. The wave power generation system according to claim 1, further comprising:
a rotational frequency detector configured to detect a rotational frequency of the power generator;
a liquid pressure detector configured to detect the pressure of the operating liquid supplied to the hydraulic motor;
a flow detector configured to detect the flow rate of the operating liquid supplied to the hydraulic motor; and
a torque detector configured to detect output torque given to the output shaft of the hydraulic motor, wherein:
the controller compares a power generation amount, a first output value, and a second output value with each other, the power generation amount being calculated based on the set torque command and a rotational frequency detected value detected by the rotational frequency detector, the first output value being calculated based on a liquid pressure detected value detected by the liquid pressure detector and a flow rate detected value detected by the flow detector, the second output value being calculated based on the output torque detected by the torque detector and the rotational frequency detected value detected by the rotational frequency detector; and
when the power generation amount, the first output value, and the second output value are inconsistent with each other, the controller determines that there is a failure.

9. The wave power generation system according to claim 1, further comprising a liquid pressure detector configured to detect pressure of the operating liquid flowing through the main passage, wherein:
the accumulator device includes a plurality of accumulators and a plurality of switching valves;
accumulable pressure of the operating liquid is different among the plurality of accumulators;
the plurality of switching valves are provided so as to correspond to the plurality of accumulators, and each of the switching valves switches a connection status between the corresponding accumulator and the main passage; and
the controller controls operations of the plurality of switching valves in accordance with a liquid pressure detected value detected by the liquid pressure detector to switch a connection status between each of the plurality of accumulators and the main passage.

* * * * *